US012673371B2

(12) United States Patent
Ryan et al.

(10) Patent No.: US 12,673,371 B2
(45) Date of Patent: Jul. 7, 2026

(54) BUILD PLATE ASSEMBLY FOR ADDITIVE MANUFACTURING

(71) Applicant: GM GLOBAL TECHNOLOGY OPERATIONS LLC, Detroit, MI (US)

(72) Inventors: Daniel Roy Ryan, Fenton, MI (US); Whitney Ann Poling, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 291 days.

(21) Appl. No.: 18/237,692

(22) Filed: Aug. 24, 2023

(65) Prior Publication Data

US 2025/0065412 A1 Feb. 27, 2025

(51) Int. Cl.
*B22F 12/30* (2021.01)
*B33Y 30/00* (2015.01)

(52) U.S. Cl.
CPC .............. *B22F 12/30* (2021.01); *B33Y 30/00* (2014.12)

(58) Field of Classification Search
None
See application file for complete search history.

(56) References Cited

U.S. PATENT DOCUMENTS

| | | | |
|---|---|---|---|
| 10,145,271 B2 | 12/2018 | Brown et al. | |
| 10,151,269 B2 | 12/2018 | Brown et al. | |
| 10,294,552 B2 | 5/2019 | Liu et al. | |
| 10,435,773 B2 | 10/2019 | Liu et al. | |
| 10,487,741 B2 | 11/2019 | Brown et al. | |
| 10,487,868 B2 | 11/2019 | Brown et al. | |
| 10,514,036 B2 | 12/2019 | Brown et al. | |
| 10,982,306 B2 | 4/2021 | Bobel et al. | |
| 2017/0151631 A1 | 6/2017 | Kuo et al. | |
| 2019/0291182 A1 | 9/2019 | Bobel et al. | |
| 2020/0123640 A1 | 4/2020 | Bobel et al. | |
| 2020/0306885 A1 | 10/2020 | Bobel et al. | |
| 2020/0307107 A1 | 10/2020 | Madinger et al. | |
| 2021/0206072 A1 | 7/2021 | Chae et al. | |
| 2021/0308759 A1 | 10/2021 | Smith et al. | |
| 2021/0402480 A1 | 12/2021 | Sweetland | |
| 2022/0134425 A1 | 5/2022 | Anam et al. | |

FOREIGN PATENT DOCUMENTS

| | | |
|---|---|---|
| DE | 10342880 A1 | 4/2005 |
| DE | 202016005655 U1 | 11/2016 |
| DE | 102015211170 A1 | 12/2016 |

OTHER PUBLICATIONS

English translation of DE102015211170 A1 (Year: 2016).*
Office Action dated Apr. 9, 2024 from German Patent Office for German Patent No. 102023133121.3; 6pgs.
U.S. Appl. No. 18/237,746, filed Aug. 24, 2023, Ryan et al.

* cited by examiner

*Primary Examiner* — Farah Taufiq

(57) ABSTRACT

A build plate assembly configured for use with an additive manufacturing machine. The build plate assembly includes a build plate defining a receptacle. An insert is seated in the receptacle and movable within the receptacle. The insert includes a build surface configured to support a product built thereon by the additive manufacturing machine. The insert is configured to expand within the receptacle in response to heat transferred to the insert from the product being built on the insert, and the receptacle is configured to accommodate the expansion.

18 Claims, 3 Drawing Sheets

BUILD PLATE ASSEMBLY FOR ADDITIVE MANUFACTURING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a build plate assembly for an additive manufacturing machine.

Additive manufacturing, also referred to as 3D printing, is a manufacturing process that creates objects by adding material layer by layer onto a build plate. Unlike traditional subtractive manufacturing methods, which include cutting material out of a solid block to achieve a desired shape, additive manufacturing builds up an object on top of the build plate. The material of each layer is fused together to create a cohesive product. This process typically generates heat, which is transferred to the build plate.

SUMMARY

The present disclosure includes, in various features, a build plate assembly configured for use with an additive manufacturing machine, the build plate assembly including: a build plate defining a receptacle; and an insert seated in the receptacle and movable within the receptacle, the insert including a build surface configured to support a product built thereon by the additive manufacturing machine. The insert is configured to expand within the receptacle in response to heat transferred to the insert from the product being built on the insert, and the receptacle is configured to accommodate the expansion.

In further features, the build plate includes an outer plate surface; and the insert includes an outer insert surface configured as the build surface, the outer insert surface protrudes beyond the outer plate surface prior to the expansion.

In further features, the present disclosure includes a backing plate on an inner plate surface of the build plate, the inner plate surface is opposite to the outer plate surface.

In further features, the receptacle is defined by an inner sidewall of the build plate, the inner sidewall tapers outward from an outer plate surface of the build plate such that the receptacle is smallest at the outer plate surface; the insert includes an angled side surface that is opposite to the inner sidewall; and in response to the expansion, the angled side surface of the insert slides along the inner sidewall of the receptacle to draw the insert into the receptacle from an outward position to an inward position.

In further features, the inner sidewall is tapered at 5°-40°.

In further features, the angled side surface of the insert contacts the inner sidewall of the build plate before and after the expansion.

In further features, the present disclosure includes a biasing member in cooperation with the insert to bias the insert in the outward position.

In further features, the build plate assembly is configured to be mounted to an elevator platform of the additive manufacturing machine.

In further features, the insert is a first insert and the receptacle is a first receptacle; the build plate defines a second receptacle; and a second insert is seated in the second receptacle and movable within the second receptacle.

In further features, the product includes the insert.

In further features, the insert includes a tab configured to cooperate with a recess of the build plate to align a feature of the insert with the product built on the insert.

The present disclosure includes, in various features, a build plate assembly configured for use with an additive manufacturing machine. The build plate assembly has a build plate including: an outer plate surface and an inner plate surface opposite to the outer plate surface; and an internal sidewall extending from the outer plate surface to the inner plate surface to define a receptacle in the build plate. The internal sidewall tapers outward from the outer plate surface to the inner plate surface. An insert is seated within the receptacle of the build plate. The insert includes: an outer insert surface and an inner insert surface opposite to the outer insert surface, the outer insert surface configured as a build surface to support a product built thereon by the additive manufacturing machine; and an angled side surface extending from the outer insert surface to the inner insert surface, the angled side surface is opposite to the internal sidewall. In response to heat transferred to the insert from the product being built on the insert, the insert is configured to expand within the receptacle and slide into the receptacle from an outward position to an inward position.

In further features, the insert is biased in the outward position with a spring.

In further features, the angled side surface is in contact with the internal sidewall.

In further features, the product includes the build plate.

In further features, a backing plate is fastened to the build plate.

In further features, the angled side surface of the insert tapers outward from the outer insert surface to the inner insert surface The present disclosure further includes, in various features, an additive manufacturing machine having an elevator platform and a build plate assembly configured to be mounted to the elevator platform. The build plate assembly includes a build plate defining a receptacle extending through the build plate, and an insert seated in the receptacle and movable within the receptacle. The insert includes a build surface configured to support a product built thereon by the additive manufacturing machine. The insert is configured to expand within the receptacle in response to heat transferred to the insert from the product being built on the insert, and the receptacle is configured to accommodate the expansion.

In further features, the receptacle is defined by an inner sidewall of the build plate. The inner sidewall tapers outward from an outer plate surface of the build plate such that the receptacle is smallest at the outer plate surface. The insert includes an angled side surface that is opposite to the inner sidewall. In response to the expansion, the angled side surface of the insert slides along the inner sidewall of the receptacle to draw the insert into the receptacle from an outward position to an inward position.

In further features, the angled side surface of the insert tapers outward from the build surface to an inner insert surface.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
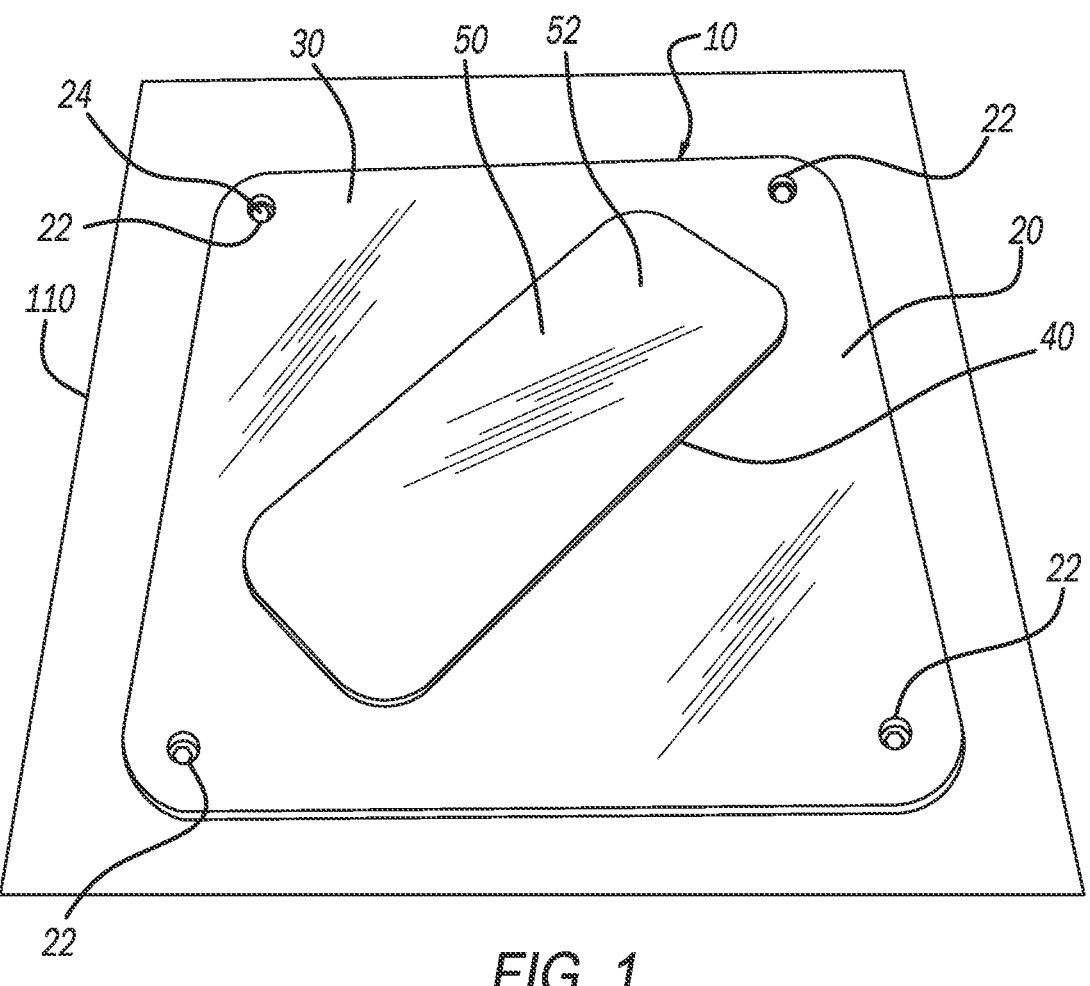
FIG. 1 is a perspective view of a build plate assembly in accordance with the present disclosure mounted to an additive manufacturing machine.

FIG. 1 illustrates a build plate assembly 10 in accordance with the present disclosure. The build plate assembly 10 is configured to be mounted to an additive manufacturing machine 110 configured to build any suitable product on the build plate assembly 10. The additive manufacturing machine 110 may be any suitable machine configured to build the product by depositing a plurality of material layers on the build plate assembly 10, such as by three-dimensional printing. The additive manufacturing machine 110 may be a metal additive manufacturing machine, for example. The additive manufacturing machine 110 may be configured to build any suitable vehicle-related products, such as, but not limited to, engine components, dashboard components, user interface components (e.g., buttons, knobs, switches, etc.), body components, door handles, interior door components, exhaust tips, etc. The additive manufacturing machine 110 may be configured to build products for use with any suitable vehicle, such as any suitable passenger vehicle, mass transit vehicle, aircraft, watercraft, commercial vehicle, construction vehicle, etc. The additive manufacturing machine 110 may be configured to build products for any suitable non-vehicular applications as well.

Figure 2:
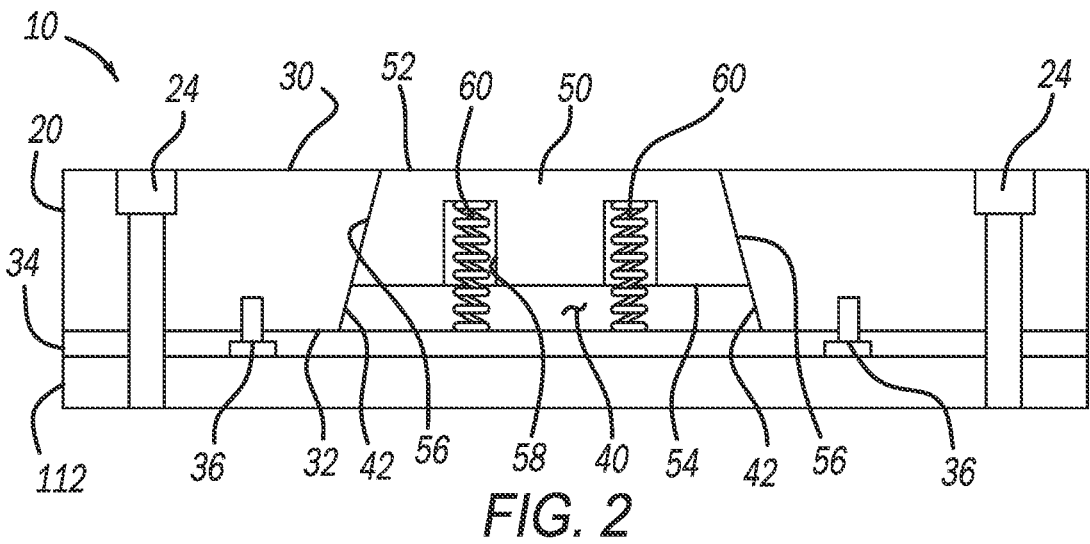
FIG. 2 is a cross-sectional view of the build plate assembly mounted to an elevator platform of the additive manufacturing machine.

With continued reference to FIG. 1, and additional reference to FIG. 2, the build plate assembly 10 includes a build plate 20 defining a plurality of openings 22 configured to receive any suitable fasteners 24. The fasteners 24 are configured to mount the build plate assembly 10 to an elevator platform 112 of the additive manufacturing machine 110. The build plate 20 includes an outer plate surface 30 and an inner plate surface 32, which is opposite to the outer plate surface 30. A backing plate 34 is mounted to the inner plate surface 32 by any suitable fasteners 36. Alternatively, the springs 60 may be mounted to the elevator platform 112 and the backing plate 34 need not be included.

The build plate 20 defines a receptacle 40 between the outer plate surface 30 and the inner plate surface 32. More specifically, an inner sidewall 42 of the build plate 20 extends from the outer plate surface 30 to the inner plate surface 32. The inner sidewall 42 defines the receptacle 40. The inner sidewall 42 angles outward from the outer plate surface 30 to the inner plate surface 32. The inner sidewall 42 may be angled from about 5° to about 40°, for example.

Seated within the receptacle 40 is an insert 50. The insert 50 is movable within the receptacle 40 to accommodate expansion and contraction of the insert 50 in response to heat generated during manufacturing. The insert 50 includes an outer insert surface 52 and an inner insert surface 54, which is opposite to the outer insert surface 52. The outer insert surface 52 is configured as a build surface on which the additive manufacturing machine 110 builds the product. An angled side surface 56 of the insert 50 extends from the outer insert surface 52 to the inner insert surface 54. The angled side surface 56 tapers outward from the outer insert surface 52 to the inner insert surface 54. The angled side surface 56 is angled to match an angle of the inner sidewall 42. The angled side surface 56 abuts the inner sidewall 42 to prevent powder from which the product is made from becoming trapped between the insert 50 and the build plate 20. The angled side surface 56 of the insert 50 slides along the inner sidewall 42 as the insert 50 expands and contracts during the additive manufacturing process, as explained herein.

Figure 4:
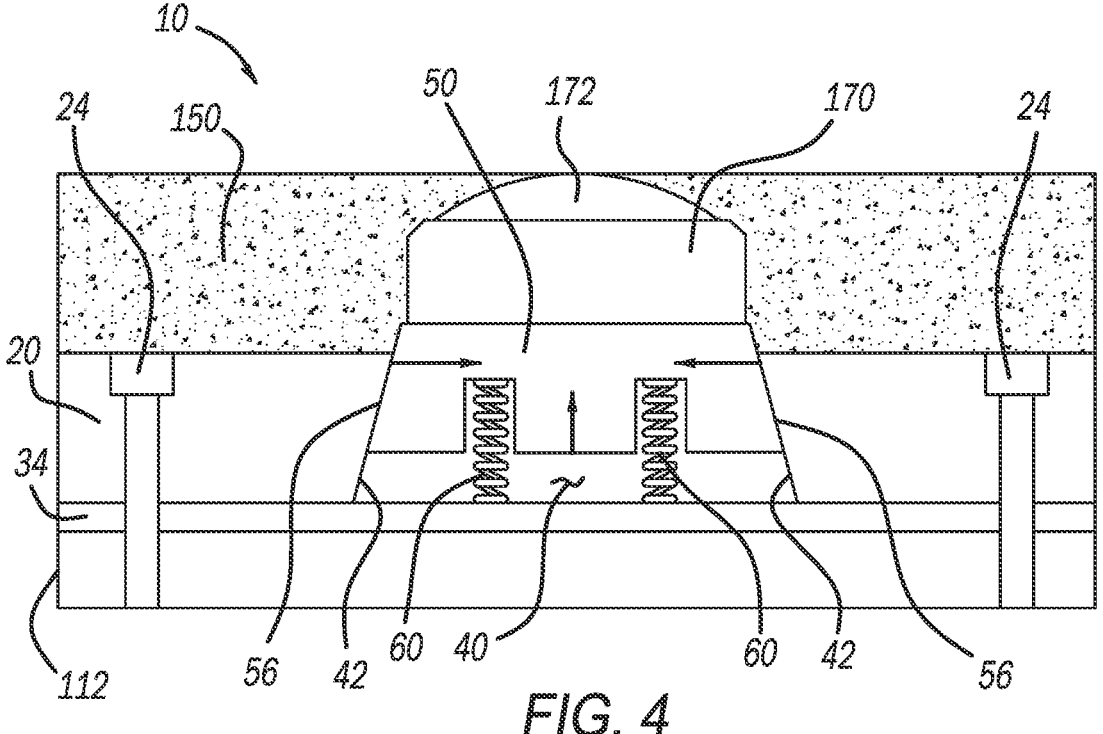
FIG. 4 is a cross-sectional view of the build plate assembly with the product formed therein, the insert contracts after cooling.

The insert 50 defines one or more receptacles 58. The receptacles 58 include a biasing member 60, such as a spring. The biasing member 60 is configured to bias the insert 50 in the outer position of FIG. 2. In the outer position of FIG. 2, the outer insert surface 52 is flush with the outer plate surface 30, as illustrated in FIG. 2. Alternatively, in the outer position the outer insert surface 52 may protrude outward beyond the outer plate surface 30, as illustrated in FIGS. 1 and 4. In applications without the backing plate 34, the biasing members 60 are configured to apply a small preload (e.g., about 10% deflection of the biasing members) to the insert 50 when the build plate 20 is fastened onto the elevator platform 112 to ensure a tight fit between the insert 50 and the build plate 20. When the backing plate 34 is included, the backing plate 34 will compress the springs 60 when the backing plate 34 is mounted to the build plate 20. The receptacles 58 may be formed in the insert 50 in any suitable manner, such as by machining. The receptacles 58 may have locator dowels or be threaded to be used for fixturing the insert 50 and the product formed on the insert 50 for final surface finishing after the build.

The insert 50 may be formed in any suitable manner. For example, the insert 50 may be machined out from the build plate 20 by wire EDM, waterjet, or any other suitable process. The insert 50 may also be machined from any suitable stock material instead of being formed from the build plate 20. The receptacle 40 of the build plate 20 may be machined into the build plate 20 to provide the inner sidewall 42 with an angle matching the angled side surface 56 of the insert 50.

Prior to being seated in the receptacle 40 of the build plate 20, the insert 50 may be machined to include various features. For example, the insert 50 may be machined to include inlet/outlet ports for cooling or heating passageways, ejector pin holes, thermal sensing, a venting line, etc. Plugs may be inserted into the pre-machined openings in the insert 50 to prevent powder from falling into the machined openings during the build. After the completed product is removed from the build plate 20, the plugs may be removed and the internal features of the product are de-powdered, as needed. The plugs may be reusable and configured to fit into the openings, and held in position with a threaded pipe plug or press fit pin, for example.

The build plate 20 has a modulus and hardness that is the same as, or greater than, the modulus and hardness of the insert 50. To enhance wear resistance of the build plate 20, the inner sidewall 42 may be carburized or nitrided to locally increase hardness at the inner sidewall 42 where the insert 50 contacts the inner sidewall 42. Alternatively, the inner sidewall 42 may be coated with a material that is harder than the insert 50. The inner sidewall 42 and the angled side surface 56 may be machined smooth, such as by polishing to less than approximately Ra=4 μm, and a lubricant stable at elevated temperature, such as graphite, may be applied to the inner sidewall 42 and/or the angled side surface 56 to allow the insert 50 to move freely and smoothly.

Figure 3:
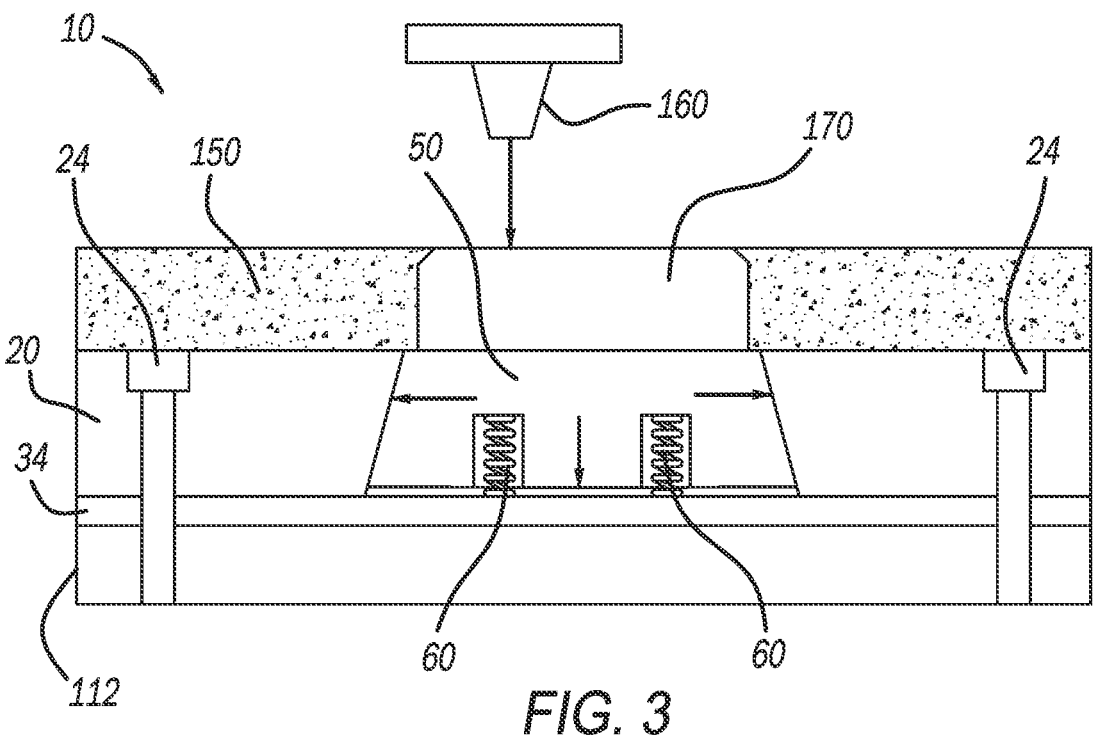
FIG. 3. is a cross-sectional view of the build plate assembly with a product being formed on an insert thereof by additive manufacturing, heat generated from forming the product is transferred to the insert causing the insert to expand into a receptacle.

FIG. 3 illustrates a first portion 170 of a product being formed on the insert 50 by the additive manufacturing machine 110. To form the first portion 170, powder 150 is first deposited on the outer plate surface 30 of the build plate 20, and on the outer insert surface 52 of the insert 50. The build plate 20 may be made of any suitable material, such as any suitable alloy. The insert 50 may also be made of any suitable material, such as any suitable alloy that is the same as, or different from, the alloy of the build plate 20. The powder 150 is any suitable powder alloy configured to be welded to the outer insert surface 52 by the laser 160. The alloy of the insert 50 may be the same as, or different from, the alloy of the powder 150.

A laser 160 fuses the powder 150 arranged on the outer insert surface 52 to build the first portion 170 of the product. Numerous layers of the powder 150 are deposited, and heated by the laser 160 to build the product upward layer by layer. As the powder 150 is heated by the laser 160, heat is transferred to the insert 50. As the insert 50 is heated, the insert 50 expands outward and downward as illustrated by the arrows of FIG. 3, for example. As the insert 50 expands outward against the inner sidewall 42 of the receptacle 40, which is tapered, the insert 50 expands downward towards the backing plate 34 and into the receptacle 40 from the outward position of FIG. 1 or FIG. 2 to an inward position shown in FIG. 3. Specifically, as the insert 50 expands, the side surface 56 slides along the inner sidewall 42 of the receptacle 40, both of which are angled, to allow the insert 50 to expand into the receptacle 40 to the inward position.

FIG. 4 illustrates a second portion 172 of the product formed on the first portion 170. The second portion 172 is formed by fusing with the laser 160 the powder 150 deposited on top of the first portion 170. After the product is completely formed, and the first portion 170 and the second portion 172 cool, the insert 50 will also cool. As the insert 50 cools, the insert 50 contracts back to its original shape and size, or close thereto. As illustrated in FIG. 4, the biasing members 60 move the insert 50 back to the outer position where the outer insert surface 52 is flush with the outer plate surface 30 in the example of FIG. 2, or protrudes outward beyond the outer plate surface 30, as illustrated in the example of FIG. 4.

After the product has been fully formed, the excess powder 150 is removed, and the build plate assembly 10 is detached from the additive manufacturing machine 110. The insert 50 with the product formed thereon is removed out of the receptacle 40 from the side of the inner plate surface 32. In some applications, the insert 50 is part of the product. Thus, the insert 50 need not be separated from the first portion 170 of the product, or any other portion of the product. In other applications, the insert 50 may not be part of the product, and thus the insert 50 will be separated from the first portion 170 in any suitable manner.

Once the insert 50 is removed from cooperation with the build plate 20, the build plate 20 may be reused for forming an additional product on an additional insert placed within the receptacle 40. Thermal stresses due to repeated, rapid heating and cooling of the build layers are contained within the insert 50. Thus, the build plate 20 does not experience permanent distortion due to plastic deformation. Preventing permanent distortion of the build plate 20 also prolongs the life of other components of the build plate assembly 10 and the additive manufacturing machine 110. For example, the fasteners 24 may also be reused, and a powder recoating arm for applying the powder 150 is protected from any possible damage.

Figure 5:
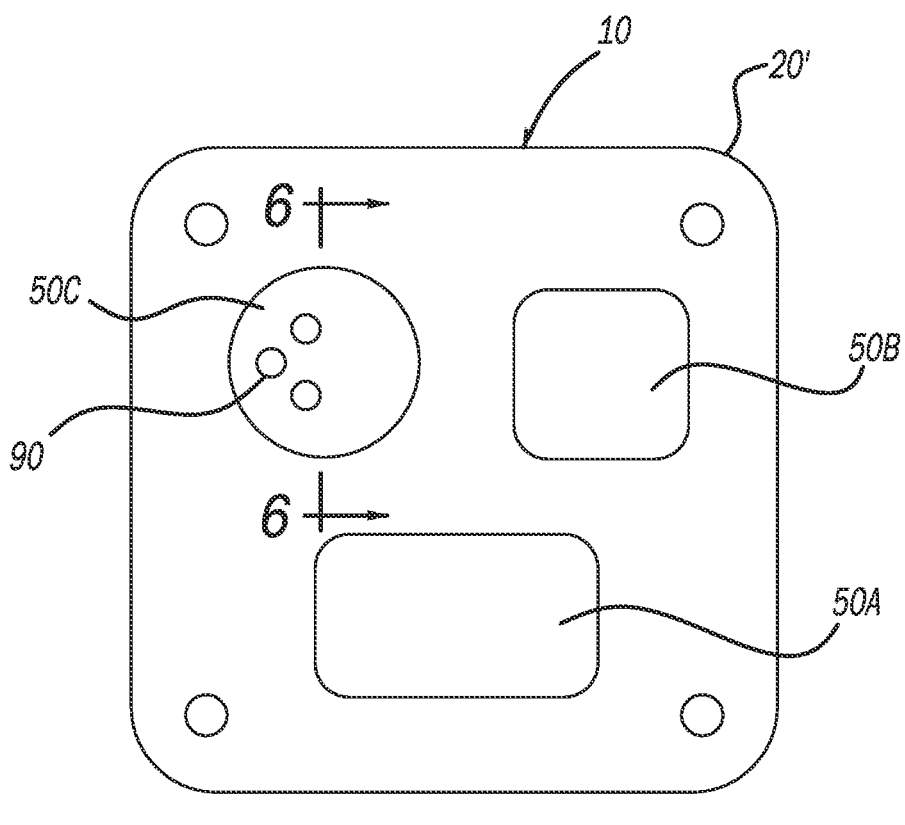
FIG. 5 is a plan view of another build plate assembly in accordance with the present disclosure, the build plate assembly including multiple inserts each with a build surface.

With reference to FIG. 5, another build plate 20' in accordance with the present disclosure is illustrated. The build plate 20' defines a plurality of receptacles, each one of which is configured to receive a different insert, such as a first insert 50A, a second insert 50B, and a third insert 50C. FIG. 5 illustrates the build plate 20' configured to accommodate three inserts, but the build plate 20' may be configured to accommodate any suitable number of inserts, such as two inserts or more than three inserts. The inserts may have any suitable size and shape. In the example of FIG. 5, the insert 50A is rectangular, the insert 50B is square, and the insert 50C is circular. Each one of the inserts 50A, 50B, and 50C includes a build surface configured to support a product formed thereon by the additive manufacturing machine 110.

Figure 6:
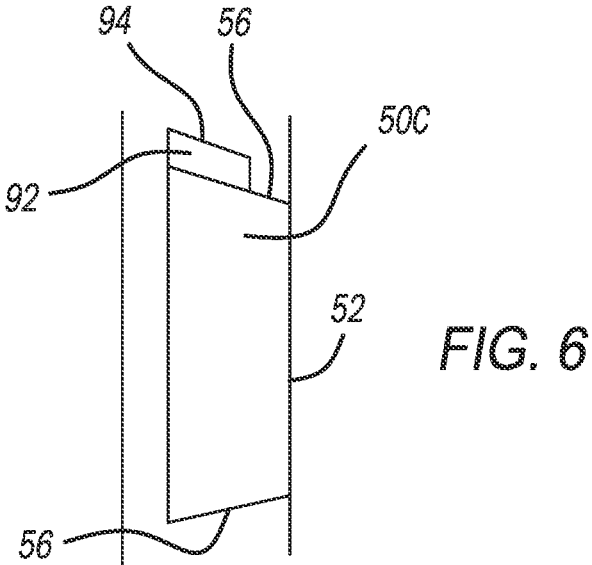
FIG. 6 is a cross-sectional view taken along line 6-6 of FIG. 5.

One or more of the inserts 50A, 50B, 50C may include any suitable features to be aligned with features of the product built on the inserts 50A, 50B, 50C. For example, the insert 50C includes a plurality of openings 90, which may be configured as cooling lines. The openings 90 will be aligned with corresponding cooling lines of a product built on the insert 50C. Thus, the insert 50C will be included as a portion of the product. To prevent powder 150 from falling into the openings 90 as the product is formed, plugs may be inserted into the openings 90. The openings 90 may be formed in the insert 50C in any suitable manner, such as by machining prior to attachment of the build plate 20' to the elevator platform 112. With reference to FIG. 6, the insert 50C may include a tab 92, which is configured to be received in a recess 94 of the build plate 20. Cooperation between the tab 92 and the recess 94 rotationally aligns the insert 50C and the openings 90 during the build process.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A build plate assembly configured for use with an additive manufacturing machine, the build plate assembly comprising: a build plate including an inner sidewall defining a receptacle, the inner sidewall tapers outward from an outer plate surface of the build plate, the receptacle is smallest at the outer plate surface; and an insert seated in the receptacle and movable within the receptacle, the insert including a build surface configured to support a product built thereon by the additive manufacturing machine, an inner insert surface opposite to the build surface, and an angled side surface extending between the build surface and the inner insert surface, the angled side surface is opposite to the inner sidewall; wherein: the insert is configured to expand within the receptacle in response to heat transferred to the insert from the product being built on the insert, and the receptacle is configured to accommodate the expansion; and in response to the expansion, the angled side surface of the insert slides along the inner sidewall of the receptacle to draw the insert into the receptacle from an outward position to an inward position into a gap defined by the build plate assembly below the inner insert surface.

2. The build plate assembly of claim 1, wherein the insert includes an outer insert surface configured as the build surface, the outer insert surface protrudes beyond the outer plate surface prior to the expansion.

3. The build plate assembly of claim 2, further comprising a backing plate on an inner plate surface of the build plate, the inner plate surface is opposite to the outer plate surface.

4. The build plate assembly of claim 1, wherein the inner sidewall is tapered at 5°-40°.

5. The build plate assembly of claim 1, wherein the angled side surface of the insert contacts the inner sidewall of the build plate before and after the expansion.

6. The build plate assembly of claim 1, further comprising a biasing member in cooperation with the insert to bias the insert in the outward position.

7. The build plate assembly of claim 1, wherein the build plate assembly is configured to be mounted to an elevator platform of the additive manufacturing machine.

8. The build plate assembly of claim 1, wherein:
the insert is a first insert and the receptacle is a first receptacle;
the build plate defines a second receptacle; and
a second insert is seated in the second receptacle and movable within the second receptacle.

9. The build plate assembly of claim 1, wherein the product includes the insert.

10. The build plate assembly of claim 1, wherein the insert includes a tab configured to cooperate with a recess of the build plate to align a feature of the insert with the product built on the insert.

11. A build plate assembly configured for use with an additive manufacturing machine, the build plate assembly comprising: a build plate including: an outer plate surface and an inner plate surface opposite to the outer plate surface; and an internal sidewall extending from the outer plate surface to the inner plate surface to define a receptacle in the build plate, the internal sidewall tapers outward from the outer plate surface to the inner plate surface, the receptacle is smallest at the outer plate surface; an insert seated within the receptacle of the build plate, the insert including: an outer insert surface and an inner insert surface opposite to the outer insert surface, the outer insert surface configured as a build surface to support a product built thereon by the additive manufacturing machine; and an angled side surface extending from the outer insert surface to the inner insert surface, the angled side surface is opposite to the internal sidewall; wherein: in response to heat transferred to the insert from the product being built on the insert, the insert is configured to expand within the receptacle and the receptacle is configured to accommodate the expansion; and in response to the expansion, the angled side surface of the insert slides along the internal sidewall defining the receptacle to draw the insert and slide into the receptacle from an outward position to an inward position into a gap defined by the build plate assembly below the inner insert surface.

12. The build plate assembly of claim 11, wherein the insert is biased in the outward position with a spring.

13. The build plate assembly of claim 11, wherein the angled side surface is in contact with the internal sidewall.

14. The build plate assembly of claim 11, wherein the product includes the build plate.

15. The build plate assembly of claim 11, further comprising a backing plate fastened to the build plate.

16. The build plate assembly of claim 11, wherein the angled side surface of the insert tapers outward from the outer insert surface to the inner insert surface.

17. An additive manufacturing machine comprising: an elevator platform; a build plate assembly configured to be mounted to the elevator platform, the build plate assembly including: a build plate including an inner sidewall defining a receptacle extending through the build plate, the inner sidewall tapers outward from an outer plate surface of the build plate, the receptacle is smallest at the outer plate surface; and an insert seated in the receptacle and movable within the receptacle, the insert including a build surface configured to support a product built thereon by the additive manufacturing machine, an inner insert surface opposite to the build surface, and an angled side surface extending between the build surface and the inner insert surface, the angled side surface is opposite to the inner sidewall; wherein: the insert is configured to expand within the receptacle in response to heat transferred to the insert from the product being built on the insert, and the receptacle is configured to accommodate the expansion; and in response to the expansion, the angled side surface of the insert slides along the inner sidewall of the receptacle to draw the insert into the receptacle from an outward position to an inward position into a gap defined by the build plate assembly below the inner insert surface.

18. The additive manufacturing machine of claim 17, wherein the angled side surface of the insert tapers outward from the build surface to the inner insert surface.

* * * * *